3,140,310
N,N'-DI(LOWER ALKENYL)BICARBAMATE ESTERS
Arnold Zweig and Arthur Kentaro Hoffmann, Stamford, Conn., assignors to American Cyanamid Company, Stamford, Conn., a corporation of Maine
No Drawing. Filed Aug. 17, 1962, Ser. No. 217,546
6 Claims. (Cl. 260—482)

This invention relates to certain novel N,N'-di(lower alkenyl)bicarbamate esters and, more particularly, is concerned with novel compounds which may be represented by the following general formula:

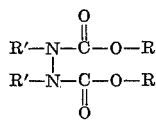

wherein R is lower alkyl and R' is lower alkenyl. Suitable lower alkyl substituents are those having up to about six carbon atoms. Suitable lower alkenyl substituents are, for example, allyl, methallyl, crotyl, 3-butenyl, etc. Typical compounds represented by the above general formula are, for example, dimethyl N,N'-diallylbicarbamate, dimethyl N,N'-dicrotylbicarbamate, diethyl N,N'-diallylbicarbamate, diethyl N,N'-dimethallylbicarbamate, and diisopropyl N,N'-di(3-butenyl)bicarbamate.

The novel compounds of the present invention are clear oils of high boiling point or white crystalline solids of low melting point. They are generally insoluble in water but relatively soluble in organic solvents such as lower alkanols, esters, ketones, benzene, toluene, chloroform, and the like.

The novel compounds of the present invention have useful pharmacological properties. They are central nervous system depressants of the tranquilizer or muscle relaxant type with good activity at non-toxic doses thereby demonstrating a favorable therapeutic index or margin of safety. They may be considered useful tranquilizing, anti-anxiety, or central nervous system depressant agents at doses between about 50 mg. and about 500 mg. per individual dose. The dosage regimen may be adjusted to provide the optimum therapeutic response. For example, several doses may be administered daily, or the dose may be proportionately reduced as indicated by the exigencies of the therapeutic situation.

The novel compounds of the present invention may be readily prepared by the interaction of an appropriate alkenyl halide with the N,N'-dipotassium salt of an appropriate di(lower alkyl) azodicarboxylate dianion. The conversion of a di(lower alkyl) azodicarboxylate to the N,N'-dipotassium salt of its dianion may be carried out by direct metallation of the azodicarboxylate ester with finely divided potassium metal. This metallation reaction may be carried out at temperatures ranging from about 0° C. to about 65° C., preferably from 20° C. to 30° C., in a solvent which will not enter into the reaction under the conditions employed. Such solvents may be, for example, tetrahydrofuran, 1,2-dimethoxyethane, dioxane, and the like. The metallation is generally accomplished within a period of time of from about 15 minutes to about two hours. Advantageously, this reaction is generally carried out under an atmosphere of an inert gas such as nitrogen. The N,N'-dipotassium salt of the azodicarboxylate dianion is not isolated but is most conveniently used in the solvent in which it is prepared.

The alkenylation of the N,N'-dipotassium salt of the azodicarboxylate dianion may be readily achieved by the addition of an appropriate alkenyl halide to the solution of the N,N'-dipotassium salt of the azodicarboxylate dianion. The alkenyl halide may be the chloride, bromide or iodide. Suitable alkenyl halides may be, for example, allyl bromide, allyl iodide, methallyl chloride, methallyl iodide, crotyl chloride, crotyl bromide, 3-butenyl chloride, etc. As in the case of the metallation reaction, the alkenylation is carried out at temperatures ranging from about 0° C. to about 65° C., preferably from 20° C. to 30° C., over a period of time of from about 15 minutes to several hours or more.

The invention will be described in greater detail in conjunction with the following specific examples.

*Example 1*

In 25 ml. of 1,2-dimethoxyethane was suspended 2.34 g. of potassium metal cut into small slivers. To this suspension was added 5.22 g. of diethyl azodicarboxylate over a period of 15 minutes. During this addition, the reaction mixture was stirred vigorously under a nitrogen atmosphere and kept at 25° C. by cooling. Stirring was continued for one hour and then a solution of 12.1 g. of allyl bromide in 20 ml. of 1,2-dimethoxyethane was added dropwise. The reaction mixture was then stirred under a nitrogen atmosphere overnight at room temperature, treated cautiously with about 5 ml. of methanol, and then poured into excess water and extracted with 200 ml. of benzene. Concentration of the benzene extract and distillation of the residue gave 3.1 g. of diethyl N,N'-diallylbicarbamate, B.P. 92–93° C./0.5 mm.

*Example 2*

By replacing the allyl bromide employed in Example 1 by an equimolecular quantity of freshly distilled methallyl chloride and following substantially the same procedure described in Example 1, there was obtained 2.08 g. of diethyl N,N'-dimethallylbicarbamate, B.P. 103–105° C./0.5 mm.

What is claimed is:
1. A compound of the formula:

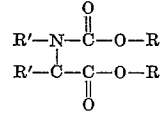

wherein R is lower alkyl and R' is lower alkenyl.
2. Dimethyl N,N'-diallylbicarbamate.
3. Dimethyl N,N'-dicrotylbicarbamate.
4. Diethyl N,N'-diallylbicarbamate.
5. Diethyl N,N'-dimethallylbicarbamate.
6. Diisopropyl N,N'-di(3-butenyl)bicarbamate.

References Cited in the file of this patent
UNITED STATES PATENTS
2,533,189     Flory et al. _____ Dec. 5, 1950

UNITED STATES PATENT OFFICE
CERTIFICATE OF CORRECTION

Patent No. 3,140,310                      July 7, 1964

Arnold Zweig et al.

It is hereby certified that error appears in the above numbered patent requiring correction and that the said Letters Patent should read as corrected below.

Column 2, lines 48 to 52, the formula should appear as shown below instead of as in the patent:

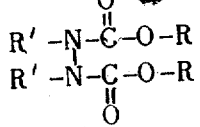

$$R'-N-\overset{O}{\underset{|}{\overset{\|}{C}}}-O-R$$

$$R'-\underset{\|}{\overset{|}{N}}-\underset{O}{\overset{}{C}}-O-R$$

Signed and sealed this 10th day of November 1964.

(SEAL)
Attest:

ERNEST W. SWIDER
Attesting Officer

EDWARD J. BRENNER
Commissioner of Patents